United States Patent
Gusat et al.

(10) Patent No.: US 11,245,638 B2
(45) Date of Patent: Feb. 8, 2022

(54) JOINT CONTROL OF COMMUNICATION AND COMPUTATION RESOURCES OF A COMPUTERIZED SYSTEM

(71) Applicant: International Business Machines Corporation, Armonk, NY (US)

(72) Inventors: Mitch Gusat, Langnau (CH); Yiyu Chen, Thalwil (CH); Ilter Ozkaya, Adliswil (CH); Alessandro Cevrero, Oberrieden (CH)

(73) Assignee: International Business Machines Corporation, Armonk, NY (US)

(*) Notice: Subject to any disclaimer, the term of this patent is extended or adjusted under 35 U.S.C. 154(b) by 488 days.

(21) Appl. No.: 16/276,781

(22) Filed: Feb. 15, 2019

(65) Prior Publication Data

US 2020/0267091 A1 Aug. 20, 2020

(51) Int. Cl.
*G06F 9/44* (2018.01)
*H04L 12/923* (2013.01)
*H04L 12/911* (2013.01)
*G06F 9/50* (2006.01)
*G06N 5/00* (2006.01)
*G06N 20/00* (2019.01)
*H04L 12/825* (2013.01)

(52) U.S. Cl.
CPC .......... *H04L 47/762* (2013.01); *G06F 9/5061* (2013.01); *G06N 5/003* (2013.01); *G06N 20/00* (2019.01); *H04L 47/25* (2013.01); *H04L 47/822* (2013.01); *H04L 47/826* (2013.01); *G06F 2209/508* (2013.01)

(58) Field of Classification Search
CPC ........................................................ G06F 1/324
USPC .......................................................... 719/318
See application file for complete search history.

(56) References Cited

U.S. PATENT DOCUMENTS

| | | | | |
|---|---|---|---|---|
| 6,115,823 A | * | 9/2000 | Velasco | G06F 1/324 713/322 |
| 2015/0355692 A1 | * | 12/2015 | Paul | G06F 1/3206 713/322 |

* cited by examiner

*Primary Examiner* — Timothy A Mudrick
(74) *Attorney, Agent, or Firm* — Harrington & Smith

(57) ABSTRACT

A computer-implemented method of controlling communication resources and computation resources of a computerized system includes continually monitoring dual observables. The dual observables include one or more communication observables pertaining to one or more communication channels of the system, and one or more compute observables pertaining to a computational workload execution by a processor of the system. The method also includes jointly adjusting dual resources of the system based on the dual observables monitored, where the dual resources include communication resources for the one or more communication channels, and computation resources for the computational workload execution. Such a method can be used for sprinting both communication and computational resources, in a consistent way, for the system to best cope with temporary situations, in terms of both workload execution and data traffic. The invention is further directed to related systems and computer program products.

20 Claims, 7 Drawing Sheets

JOINT CONTROL OF COMMUNICATION AND COMPUTATION RESOURCES OF A COMPUTERIZED SYSTEM

BACKGROUND

The invention relates in general to the field of computer-implemented techniques for controlling computation resources of a computerized system, and in particular to computerized methods for jointly controlling the speed of communication and computation in this system.

Computational sprinting refers to techniques or mechanisms to temporarily boost performance of the computational workload execution, which usually comes at the price of additional power dissipation and potential overheating. Such techniques typically rely on sprinting policy rules, which determine when to sprint up the execution and for which period of time the execution can be sprinted, e.g., given physical tolerance limits of the system.

SUMMARY

According to a first aspect, a computer-implemented method of controlling communication resources and computation resources of a computerized system is provided. The method relies on continually monitoring dual observables. The latter include, on the one hand, one or more communication observables pertaining to one or more communication channels of the system, and, on the other hand, one or more compute observables pertaining to a computational workload execution by a processor or processing means of the system. Moreover, the method includes jointly adjusting dual resources of the system based on the dual observables monitored. The adjusted resources include, on the one hand, communication resources for the one or more communication channels, and, on the other hand, computation resources for the computational workload execution. E.g., such a method can be used for sprinting both communication (e.g., I/O channels) and computational resources, in a consistent way.

According to another aspect, a computerized system is provided. Consistently with the above method, the system comprises a controller for controlling communication resources and computation resources of the system. The controller is configured, on the one hand, to continually monitor dual observables, and on the one hand, to jointly adjust dual (i.e., communication and computation) resources, as described above.

According to a final aspect, a computer program product for controlling communication resources and computation resources of a computerized system is provided. The computer program product comprises a computer readable storage medium having program instructions embodied therewith, wherein the program instructions are executable by one or more processors of the system, to cause to implement steps of the present methods.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

Figure 1:
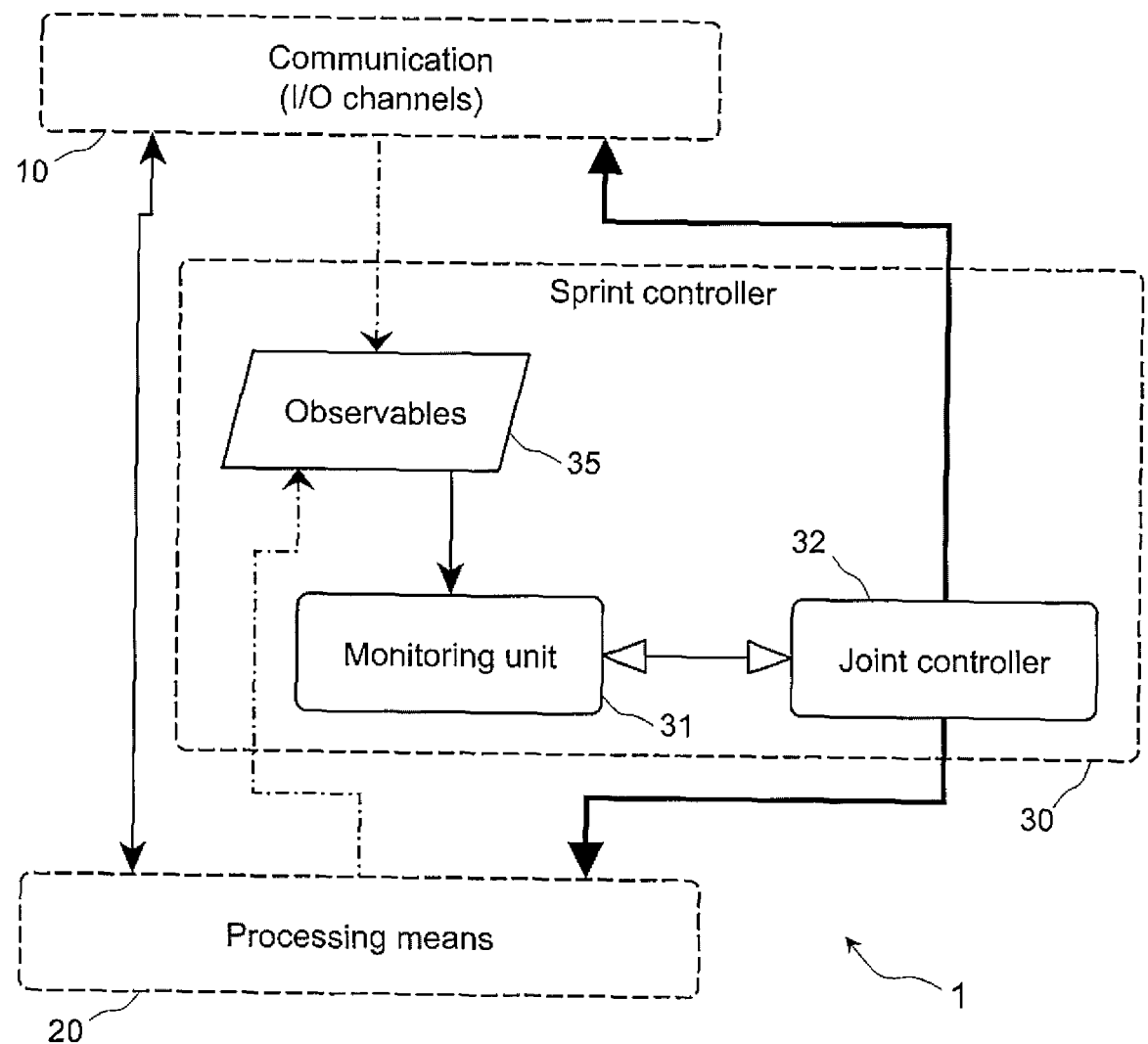
FIG. 1 is a high-level diagram of selected components of a computerized system including a controller supervising both communication (I/O) and computation resources, according to embodiments.
Figure 2:
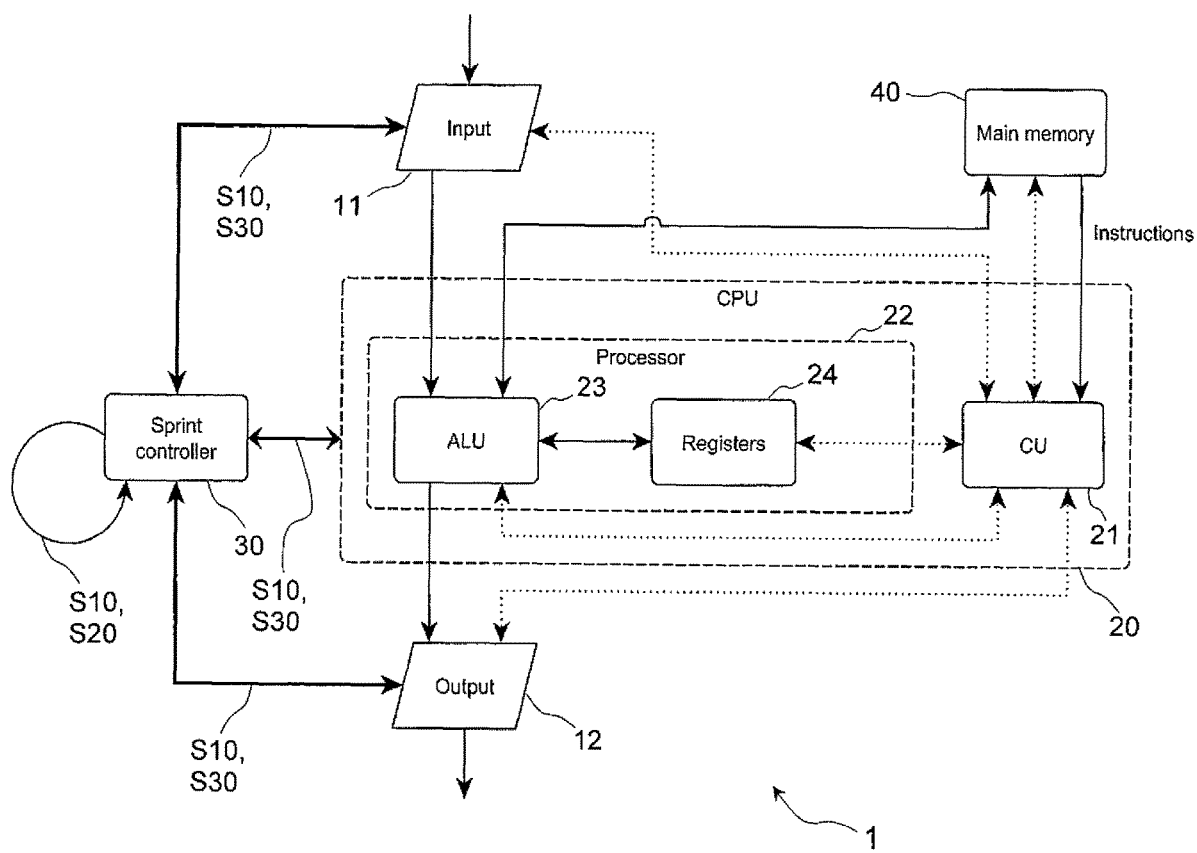
FIG. 2 is a diagram of parts of FIG. 1 forming part of a computer or a network of interconnected computers.
Figure 3:
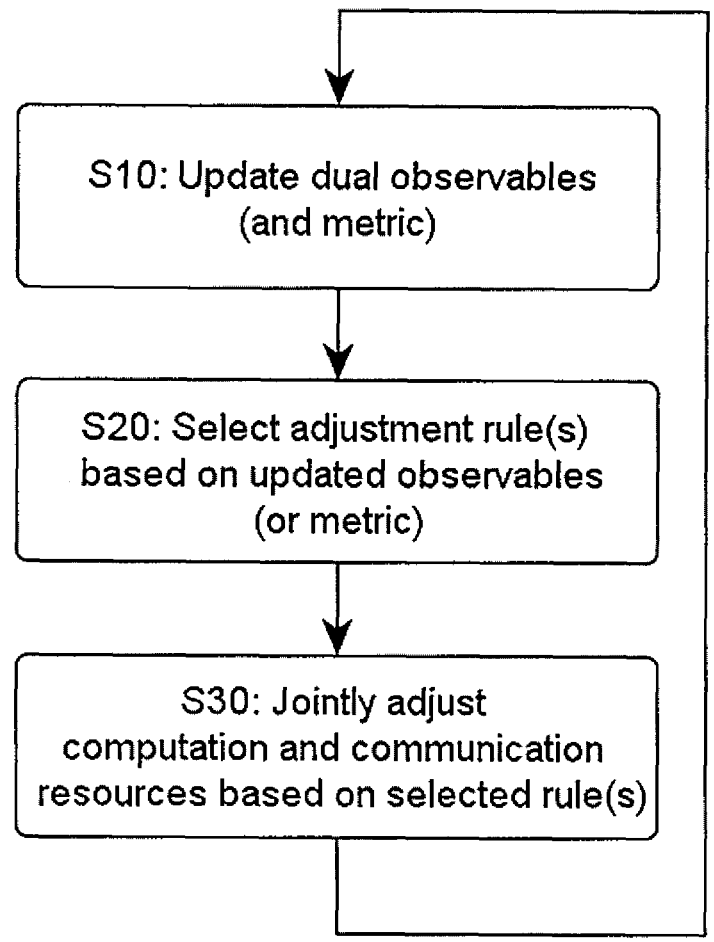
FIG. 3 is a flowchart illustrating high-level steps of a method of controlling both communication and computation resources of a system such as depicted in FIG. 1, 2, or 6, according to embodiments.

In reference to FIGS. 1-3, one example aspect is first described, which concerns a computer-implemented method of jointly controlling communication resources and computation resources of a computerized system 1, 2. This method basically relies on two steps S10, S30, as shown in FIG. 3.

Namely, observables 35 of the system are continually monitored S10 (e.g., intermittently, but not necessarily at regular intervals). Such observables are of a dual nature; they include: (i) one or (likely) several communication observables, i.e., quantities that pertain to one or more communication channels of the system 1, 2; and (ii) one or more compute observables, relating to the computational workload execution by processing means 20 of the system 1, 2.

An observable is a quantity that can be measured, e.g., a physical quantity (such as temperature, power, or energy) or any quantity (a variable or function of one or more variables) that reflects an activity between components of the system or a current state of one or more of said components. Such components are data processing components or any components participating in the data processing, such as input/output (I/O) channels (which involve data communication to/from registers, buffers, cache memory, SRAM, DRAM, internal or external, I/O peripherals, etc.), and, more generally, any channel through which data is conveyed to be processed by processing means 20 of the system.

Moreover, resources of the system 1, 2 are jointly adjusted S30, based on the observables 35 monitored S10. Such resources are again of a dual nature, as they include: (i) communication resources (e.g., clock speed/dynamic voltage and frequency scaling (DVFS), number of lanes or channels active, selective or global on/off) for said communication channels (e.g., I/O channel resources); and (ii), computation resources (e.g., clock speed/DVFS, number of active cores, selective or global on/off) for said computational workload execution. The workload refers to the type and amount of processing assigned to processing means of the system at a given time.

Said resources may for instance be jointly adjusted based on fluctuations of a metric that is a function of said observables 35. Said metric may for instance be explicitly formulated and, e.g., used as a constraint for the system to reach a certain goal. Simple heuristics may be used to that aim, as latter discussed in reference to FIG. 5. In variants, this metric may only be implicit. I.e., feature vectors may be formed from the monitored observables and used as input to a trained cognitive model, for the purpose of inferring anomalies, based on which resources of the system will be jointly adjusted.

In practice, the joint adjustment (step S30) may for example be performed according to predetermined rules, which are selected S20 based on the monitored observables, or based on a metric updated based on such observables, as illustrated in the flowchart of FIG. 3.

As present inventors have observed, solely sprinting a computational core (or cache) of processing means of a computerized system may be unproductive if its respective I/O channels are a bottleneck, and vice-versa. Having realized this, the present Inventors have designed computer systems and methods, wherein the concept of computational sprinting is extended to both computation workload and communication channels. Jointly adjusting (i.e., co-sprinting up or down) communication and computational workload execution resources of the system enables an intercoupled control of both resources to adapt (and thus improve) performance of the system, e.g., with respect to a temporary condition of the system (possibly at sub-nanosecond time scale).

The steps of monitoring S10 and jointly adjusting S30 the system's resources may for instance be continually performed (i.e., repeatedly, but not necessarily at regular intervals or in a continuous manner) and implemented as a feedback loop. This way, outcomes of the latest adjustments made S30 impact observables, which are, in turn, updated S10 to cause S20 additional adjustments S30, as necessary to best adjust the system's performance, e.g., to a non-static context, where the workload execution continually varies.

For example, the resource adjustment S30 may comprise, on the one hand, adjusting the execution speed of the processing means 20, while, on the other, adjusting capabilities of I/O channels 10 of the system, e.g., channels to/from the processing means 20 (e.g., close to the latter, see FIGS. 1 and 2). Thus, the processing means 20 may, upon sprinting, temporarily exceed the sustainable thermal limits (as in thermal design power, or TDP) to provide a brief burst of execution. In parallel, I/O channel capabilities can be adjusted based on the monitored observables, and in a consistent manner with the computational workload execution adjustment.

Note, jointly adjusting the communication and computation resources means adjusting such resources in parallel (at a same time) or in an interleaved fashion, i.e., by way of nested operations performed during short time periods. I.e., several adjustments S30 of communication resources may for example be made during a single short compute cycle, as discussed later in reference to FIG. 4. As a result, the communication and computation resources appear to be jointly adjusted during a sufficiently long period of time (e.g., on the order of $10^{-9}$ to $10^{-7}$ seconds, or more, depending on the actual implementation chosen).

All this is now described in detail, in reference to particular example embodiments. To start with, said communication channels preferably include one or more input and/or output channels (referred to as I/O channels in the following), which are data communication channel branching to and/or from said processing means 20, respectively. Note, I/O channels may not only include input channels from a given input 11 or output channels to a given output 12 of a system 1 (as assumed in the computer 1 of FIG. 2), but they may also include channels to/from registers 24 of a processor 22 of the central processing unit (CPU) 20, or channels linking a cache memory (not shown) to the processor (a single processor is assumed in FIG. 2, for simplicity). For example, an input channel may be used to convey cache data buffered at any level of cache of (but preferably close to) a processor or convey values to registers 24 of the processor 22. Registers 24 are high-speed, close storage areas in the CPU 20, where data is stored before being processed. In addition, such channels may include channels to/from one or more buffers implemented in SRAM, DRAM, Flash, and/or PCM technology, internal or external with respect to said CPU. In other examples, observables from other types of I/O channels may be monitored, such as from parallel channels/paths in a lane, a link bundle, a memory channel, or any intermediate routing channels (routing hops) involved between a source node and a destination node of the system 1, 2. More generally, such channels may include channels to/from any component such as components 11, 12, 21-24, 40 of the system 1 of FIG. 2, where data is likely to queue in view of being processed.

That is, any relevant communication channel (though preferably close to the processing means) may possibly be probed or sampled in order to monitor communication observables. Again, communication observables relate to data conveyed in order to be processed by the processing means, whereas computation observables concern the workload execution, e.g., the utilization of the CPU. Beyond the CPU utilization, other types of computation observables (e.g., CPU load) may be relied on, as known in the field of computational sprinting. To that aim, the controller 30 may include a monitoring unit 31, configured to communicate with one or more of the components 20-24, 40 of the system 1, 2. This unit may otherwise communicate with a joint controller 32, also forming part of the controller 30, in view of performing joint adjustments S30.

The adjustment S30, S31 of the communication resources will preferably be achieved by adjusting a rate of data transfer across said I/O channels (i.e., across all channels or a selected subset thereof). Steps S10 and S30 may for instance be realized by querying or otherwise accessing a control unit (CU) 21 or a combinational logic circuit 23, i.e., an arithmetic logic unit (ALU). For example, in typical embodiments, each CPU of the system 1 includes an ALU 23 to perform arithmetic and logical operations, while the CU 21 extracts instructions from the memory 40, interprets such instructions and executes them by calling on the ALU 23. I.e., the CU handles the data flow and instructions. Thus, the present controller 30 may possibly communicate with or form part of a CU or an ALU to adjust S30 resources of the system.

Figure 6:
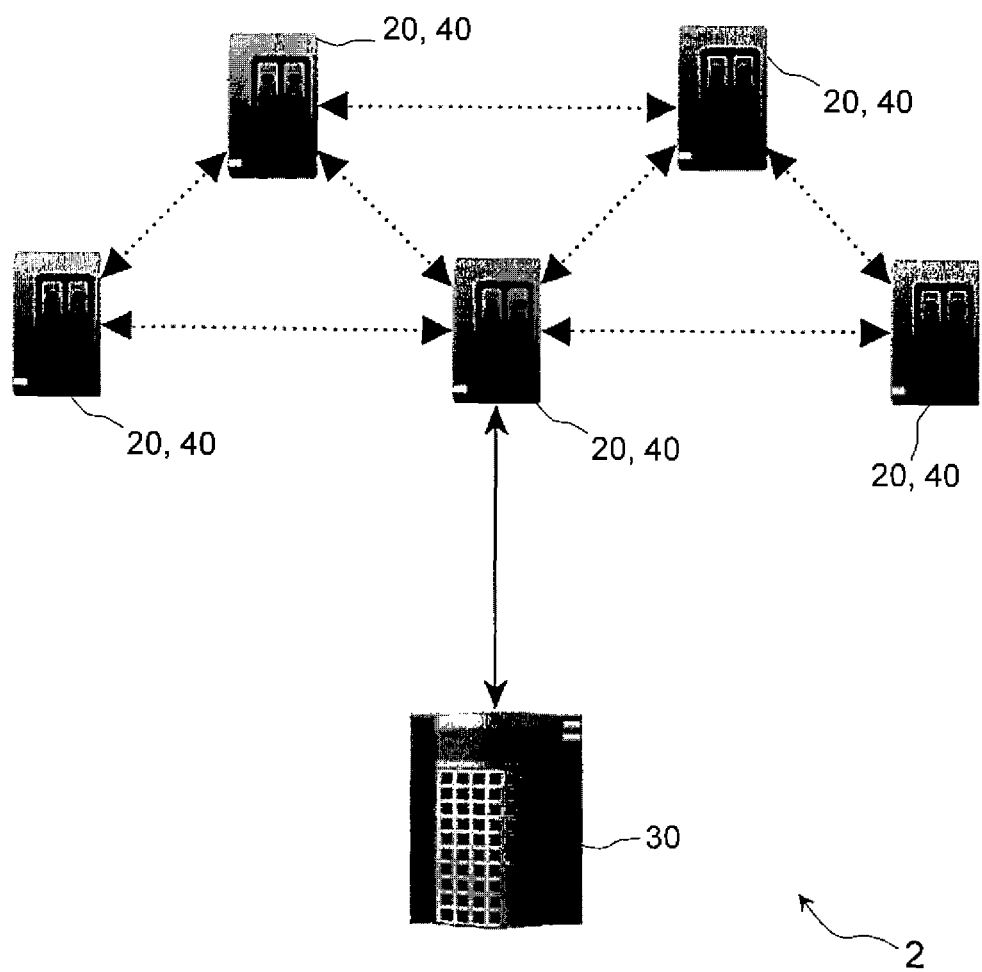
FIG. 6 is a diagram of a network of interconnected computers.

In preferred variants, however, the controller 30 will more easily be implemented as an external entity (in software and/or hardware), communicating with components (such as components 11, 12, 20-24, and 40) of the system 1, so as to assess the needed observables 35 and allocate S30 suitable resources. Moreover, a specific controller 30 may be designed, in particular where the processing means 20 comprise or consists of, e.g., graphics processing units (GPUs), digital signal processors (DSPs), custom application-specific integrated circuits (ASICs), and/or field-programmable gate arrays (FPGAs). For completeness, an external controller (including a monitoring entity) 30 shall preferably be relied on when the system is a computerized network 2 such as shown in FIG. 6. However, the controller 30 need not necessarily be implemented in hardware (contrary to what FIG. 6 suggests). It may instead be implemented in software and hence reuses hardware resources of the system 1, 2 to work.

Figure 4:
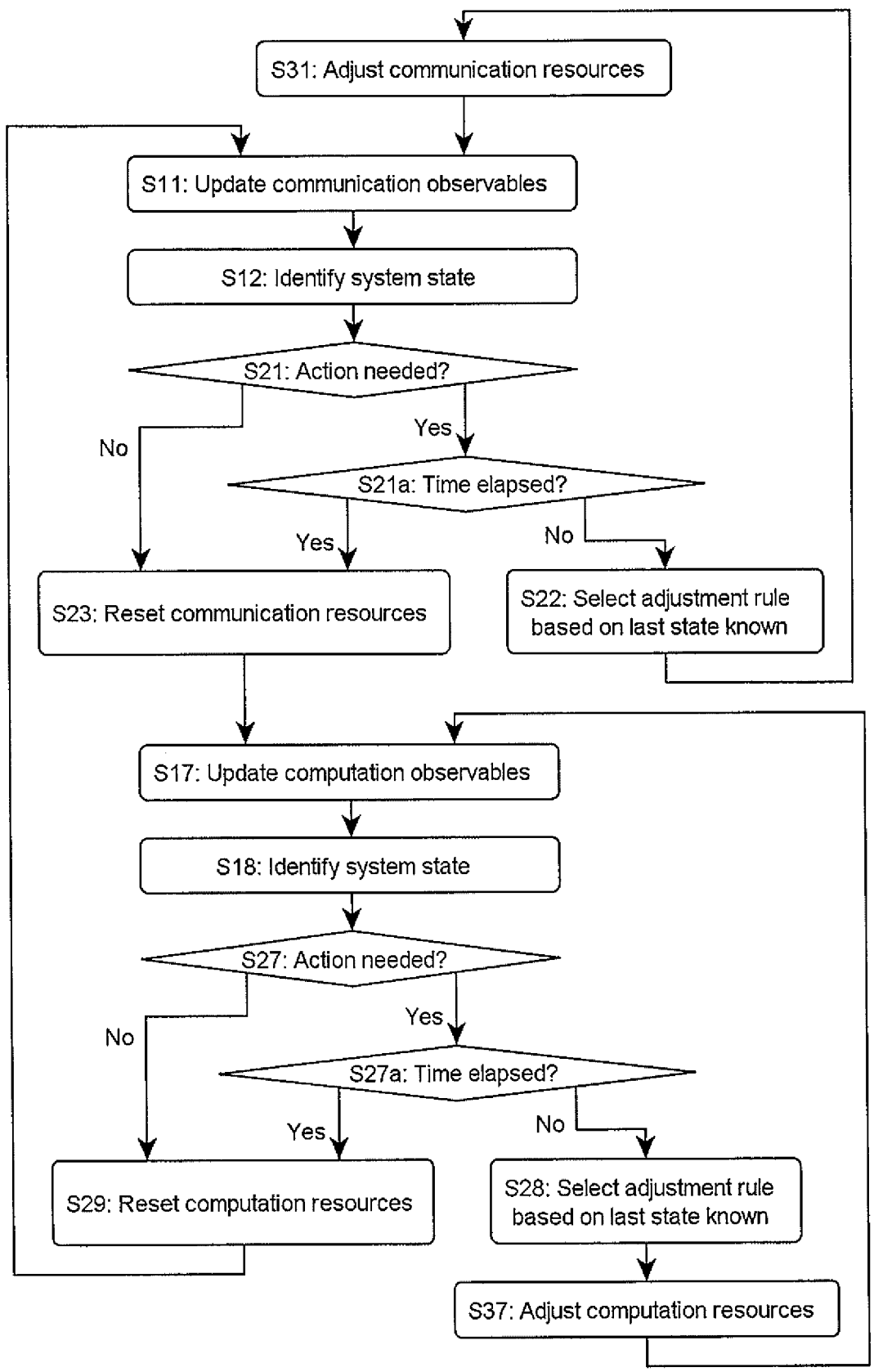
FIG. 4 is a flowchart illustrating a specific embodiment of the method of FIG. 3, where multiple steps to control communication and computation resources are interleaved.

Referring now FIG. 4, the dual resources are, in embodiments, jointly adjusted S30 by way of nested adjustment operations. For example, one or more adjustments to the communication resources may be made S31, prior to adjusting S37 the computation resources (which may involve several adjustment operations, as assumed in FIG. 4), and so on. Such adjustments are performed on short time scales and in a nested fashion, preferably according to a same global metric (implicit or explicit, based on observables of both types) and/or in view of reaching a same common, or distinctly partitioned goal (per computation and communication), e.g., meet a target power and/or temperature budget. As a result, these adjustments S30 obey a joint approach. They are preferably carried out by way of feedback control loops, see steps S11, S12, S21-S22, and S31 vs. steps S17, S18, S27-S28, and S37 in FIG. 4.

The flowchart of FIG. 4 assumes that several adjustment operations can be made for each of the communication and the computation resources, in an alternate fashion. That is, after having updated S11 communication observables, the state of the system is characterized S12 (based on both the communication and computation observables). Next, if an adjustment appears to be needed S21 (based on the last system state observed), a suitable adjustment rule is selected S22 (again, based on the last system state known) to adjust S31 the communication resources. Several such cycles S11, S12, S21, S22, S31 may accordingly be performed, e.g., subject to a timer S21a. In variants, a determined number of cycles S11-S31 could be performed. In other variants, this number may possibly be adaptively fixed, depending on an initial system state.

Upon completing communicational cycles (i.e., no action is needed anymore, or the allowed time has expired, or a maximal number of instructions or operations allowed has been reached), the computation observables are updated S17; the system state is accordingly updated S18. If an adjustment appears to be needed S27 in view of the last system state determined, a given adjustment rule is selected S28 based on last system state known and the computation resources are accordingly adjusted S37. Again, this might be subject to a timer S27a, or the count of a maximal number of cycles, etc. Note, resources of a given type (communicational or computational) may possibly be reset S23, S29 prior to switching to adjustment operations of the other type (computational or communicational), as assumed in FIG. 4.

In variants to FIG. 4, one type of adjustment operations may be favored over the other. For example, a given computational state of the processing means 20 may first be identified S18, which state is assumed to be applicable to a given period of time. This time period may for instance correspond to a single computation cycle of a processor. This state is identified due to the compute observables 35 monitored S17. Next, several successive sets of values of the communication observables 35 are identified (at each step S11), during that given period of time, so as to identify several, successive communicational states S12 of the I/O channels monitored. This way, communication resources are adjusted S31 multiple times based on the successive communicational states identified, during that same period of time. Then, a single adjustment cycle S17-S37 may be performed with respect to the sole computational resources, prior to reverting to multiple communication resources adjustments.

For example, and as evoked earlier, several sets of values of communication observables may be observed S11 during a single compute cycle (e.g., of 50 ns), based on which one or several adjustments S31 of resources allocated to communication channels may be made. E.g., multiple I/O channel control loops may be performed to assess S11 and adjust S31 the occupancy queue of data queuing toward a CPU, during a single compute cycle of this CPU.

Conversely, several adjustments S37 of the computational resources may possibly be nested within a single adjustment step of the communication resources, e.g., during a given time period (for example corresponding to a sampling period of the communication observables). In that case, several successive sets of values of the compute observables may be identified S17 during that period of time, so as to identify S18 several, successive computational states of the computational workload execution. Computation resources are thus successively adjusted S37 based on the successive computational states identified S18, prior to performing a single communicational adjustment cycle S11-S31, wherein communicational adjustments are for example based on data queues as sampled during the successively adjustment steps S37 of the computational resources. Hence, one understands that steps occurring under (after) step S31 and under (after) step S37 in FIG. 4 could actually be swapped and interleaved in different ways. Also, either of the two steps S31 and S37 could be temporarily or permanently fixed, while the other block may operate independently as described earlier.

In either case, the adjustment operations S30 are interleaved. Having multiple, interleaved adjustment steps allows a finer and more useful control of the communication and computation resources. In other approaches, though, a global response to a given condition (state) of the system (as characterized by the dual observables monitored at step S10) may be selected S20 from a set of rules, giving rise to a joint response, whereby both the computational and communication resources are adjusted in parallel.

The adjustment S30, S31 of the communication resources allocated to the I/O channels typically amounts to temporarily modifying such resources. As evoked above, such modifications will typically apply for very short time periods, e.g., less than $1.0 \times 10^{-8}$ seconds for the communication resources. On the other hand, a minimal time period for the resource modifications will likely be on the order of the nanosecond, e.g., larger than or equal to $1.0 \times 10^{-9}$ seconds. Yet, sub-nanosecond interactions are nowadays possible in state-of-the-art computerized systems, even in computer networks. More generally though, adjustments may be performed over longer time periods, e.g., less than $10^{-6}$ or even $10^{-3}$ seconds. Similarly, the computation resources may be adjusted S30, S37 (e.g., sprinted up) for very short periods of time, such that their impact on power/temperature may be limited, e.g., adding a phase-changing material as additional thermal capacitance (to the nominal CPU TDP), one may for example (co-) sprint some of resources for 100s of milliseconds before exceeding said limits.

In embodiments, the adjustment S30, S31 to the communication resources proceeds by switching on and off one or more of the I/O channels (e.g., a selection thereof, depending on the system state characterized and the adjustment rule accordingly selected S20), as in pulse-width modulation. The communication resources may for example be temporarily switched off (they are normally reset upon completing an adjustment time period). Note, CPU cores too may be switched off or on, upon adjusting the computation performance. This provides for thermal 'borrowing', i.e., shifting and reallocating the available TDP budget to the optimal resources.

In other embodiments, the adjustment S30, S31 includes temporarily clocking up or down one or more of the I/O channels. I/O channels may for instance be clocked up or down within an interval, e.g., ranging from 20 GHz to 60 GHz. This is typically performed incrementally, in multiple steps. E.g., starting at 40 GHz, a channel may be temporarily sprinted to 50 GHz depending on observations made S10. Later, the same channel maybe temporarily clocked to 60 GHz, if needed, after a second incremental step S30. At some point, however, this channel will normally return to normal operation at 40 GHz. Likewise, the related processing means may be clocked up or down, via dynamic voltage scaling and/or dynamic frequency scaling (DVFS), as needed to adjust the computation performance. In variants, I/O channels may possibly be clocked up or down within a broader interval, e.g., ranging from 5 to 200 GHz.

In more sophisticated approaches, the adjustment rules may combine the two operation modes described above: clocking up/down and switching off/on the I/O channels. That is, the rules selected S20 may result in clocking up or down the I/O channels or switching them off or on, depending on the system state characterized.

As said, the communication observables 35 monitored S10 shall typically reflect states of queues of data queuing in memory, internal or I/O channels between system components such as shown in FIG. 2. In computerized networks (FIG. 6), a suitable sampling mechanism may for instance be implemented for sampling data queues, e.g., during defined time periods. Meanwhile, the compute observables monitored S10 shall typically capture a current utilization or load of the processing means 20, for example. Still, other observables may optionally be measured, such as voltages or temperatures, in addition to queues and utilization, for example.

In embodiments, the communication observables 35 may notably reflect states of data stored on or queuing from/to the registers 24 of the processing means 20, and/or data stored on or queuing from/to a memory cache or a main memory 40 of the processing means 20. More generally, any data path (though preferably close to or within the CPU) may be probed, in order to infer a communicational state of the system. In addition, the communication observables 35 monitored S10 may possibly reflect states of buffers or flags. In all cases, the monitoring S10 (FIG. 1) shall preferably be performed in view of updating an ad hoc metric, i.e., a function taking values of the dual observables 35 monitored S10 as input. This way, the dual resources are jointly adjusted S30 based on the updated metric.

For example, for a joint computation and communication sprinting, we may define:
i. An observable feature vector $x_i = \{q_1(t) \ldots q_N(t), u_1(t) \ldots u_N(t)\}$, of queues, utilizations (and optionally voltages, temperatures); benefit functions); and
ii. Utilities (benefit functions), here called, utilComp and utilComm, each having its own Threshold, to be jointly maximized. Thus, an agent may sprint if and only if its utility exceeds its respective Threshold.

The controlled variables of choice for e.g., communications may for example be:
i. The setpoint target QueueThreshold (if a flow control loop is used), varying, e.g., between 1 and 99%;
ii. The number of parallel channels/paths in a lane, link bundle, and/or a memory channel, $\{0, 1, 2, \ldots m\}$; and
iii. The number of communication hops between the source and target $\{0, 1, \ldots n\}$, for multihop multi-core, multi-node systems.

The objective-driven co-sprinting targets or policies (one or multiple) can for example be defined as Max (utilComp>ThresholdComp, utilComm>ThresholdComm), subject to various possible constraints, related to temperature, power, throughput, delay/response times, etc.

Figure 5:
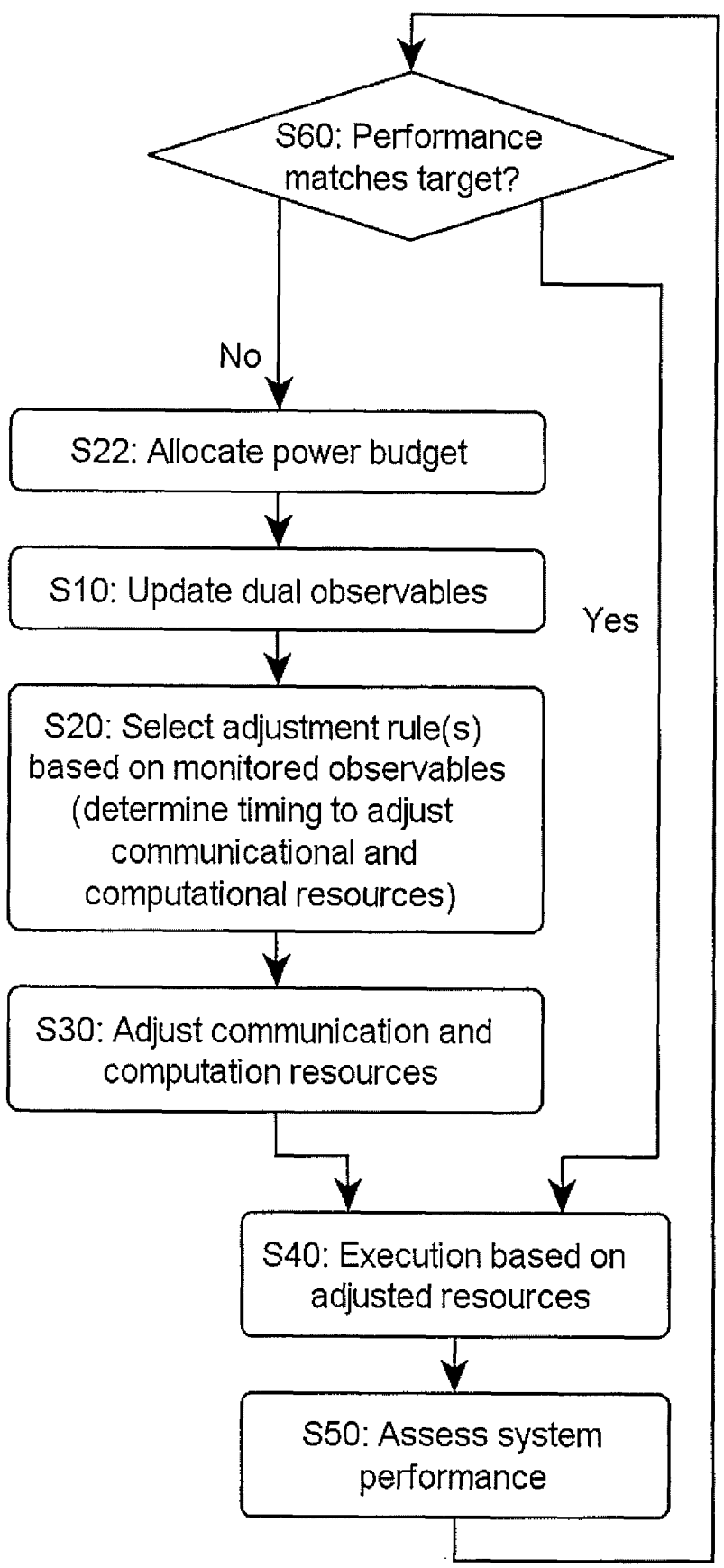
FIG. 5 is a flowchart illustrating the use of a heuristic to control communication and computation resources of a computerized system, as in embodiments.

Referring now to FIG. 5, the dual resources may for instance be jointly adjusted S30 according to a heuristic based on the updated metric. As evoked above, said heuristic shall typically be designed so as to adjust the system performance under a certain physical or workload constraint, e.g., a target temperature or power consumption, or a desired throughput (or goodput for batch jobs), delay/response times, etc.

For example, assume that a power budget is allocated S22, as in the flowchart of FIG. 5. After having updated the dual observables S10, one or more adjustment rules may be selected S20 (based on the updated observables. At the same time, a timing to adjust the communicational and computational resources is determined. The dual resources are then adjusted S30 based on the selected rules and according to the timing determined. Execution accordingly proceeds S40 based on the adjusted resources. Next, the system performance is assessed S50 and compared S60 against the target set at step S22. The modified operation of the system may be maintained for some time or further adjusted, depending on outcomes of the test performed at step S60. Eventually, the system is reset to normal operation.

Figure 7:
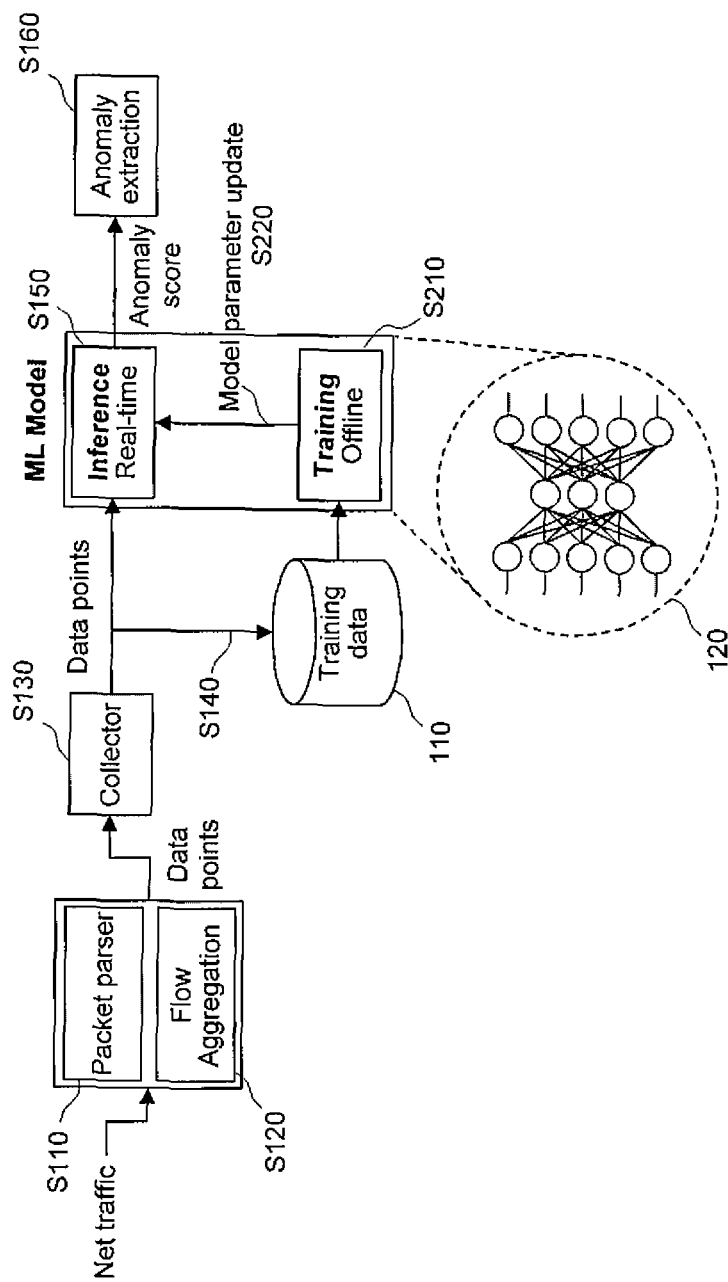
FIG. 7 is a flowchart illustrating the use of a trained machine learning model to detect anomalous data in the data traffic and data processing of a network system, based on which communication and computation resources of the network may be jointly adjusted, as in embodiments.

In variants to a heuristic, modern cognitive approaches may be preferred, as discussed now in reference to FIG. 7. In particular, the dual resources may be jointly adjusted S30 according to outcomes of a machine learning model 120. The latter is run S150 (for inference purposes) based on values of the dual observables 35 monitored S10. As illustrated in FIG. 7, this model is assumed to have been previously trained S210 based on values that can potentially be taken by the dual observables 35 as monitored at step S10. Outcomes of the model run S150 typically include predictions or classifications performed by the cognitive model.

The latter may notably be continually run based on feature vectors assembled from values of the observables monitored. I.e., the feature vectors will include values pertaining, on the one hand, to the communication observables and, on the other hand, to the compute observables. Thus, such vectors characterize current states of the system, based on which a diagnostic is made by the model run S150. For example, the machine learning model may be run based on feature vectors constructed from values capturing: (i) states of data queues in the I/O channels and (ii) states of utilization of the processing means, during training with various workloads.

The machine learning model 120 may for instance be a model trained S210 to detect S160 anomalous data from the dual observables 35 monitored S10. Anomalous data are caused by values of the dual observables 35 that deviate from expected or predicted optimal values that maximizes the joint utility of compute and communication (each above its respective threshold, yet possibly not optimal in the dual sense), e.g., an expected or predicted profile of values, whereby outliers are characterized by the differences observed from the expected/predicted profile. For example, anomalies may first be scored and then extracted based on the scores obtained, as suggested in FIG. 7. Next, resources are jointly adjusted S30 based on a response selected S20 according to the anomalous data detected S160, consistently with the methods described earlier in reference to FIG. 3. For example, the controller 30 may track deviations from a given model expectation to sprint up/down signals.

The cognitive model used may notably be a trained, unsupervised machine learning model, which allows an autonomous pre-selection and ranking of anomalies. This model may for example be implemented as an autoencoder, in which case the classifications/predictions may advantageously be performed according to a reconstruction error of the autoencoder. Still, the unsupervised model may be a multilayer perceptron (MLP) model, yet implemented in a form of an autoencoder (AE). (the same for an AE model based on long short-term memory (LSTM), or any other anomaly detector of sufficient accuracy and speed). In particular, any other anomaly detection method using normality divergence estimations may be contemplated.

If necessary, a second (e.g., supervised) cognitive model may be run S150 on top of the unsupervised model, to refine the diagnostic. Moreover, the cognitive algorithm(s) underlying the inference model(s) may be retrained, if necessary, while the previously trained model(s) is (are) used to classify data taken as inputs. Then, the retrained model(s) may be substituted to the current inference model(s). This makes it possible to fairly quickly adapt to sudden changes in a current condition of the system 1, 2 and thus to more efficiently detect new types of anomalies.

Note that, in the literature, the terms cognitive algorithm, cognitive model, machine learning model or the like are interchangeably used. In an effort to clarify terminologies, one may adopt the following definition: a machine learning model is generated by a cognitive algorithm, which learns its parameters from input data points, so as to arrive at a trained model. Thus, a distinction can be made between the cognitive algorithm being trained and the model that eventually results called trained model or retrained model upon completion of the training of the underlying algorithm.

In variants to machine learning models, a deterministic or a stochastic model may also be used.

The flowchart of FIG. 7 assumes that the system is a computerized network 2 of interconnected machines, each equipped with processing means 20 and, e.g., memory 40, such as shown in FIG. 6. More precisely, FIG. 7 illustrates operations involved during a pre-processing stage and an unsupervised processing stage, as in embodiments. Communicational data may now include data conveyed through data channels linking different machines. Such data may for example be collected, e.g., by parsing S110 data packets from distinct data sources (i.e., CPU performance counters, sensors, flags, etc., which are sampled into a set data stream/flow or time series, to form an input feature vector). Then, data flows may be aggregated S120 for each of the distinct datastreams/sensors and for given time intervals (e.g., successive and contiguous time intervals), based on the data parsed S110. Eventually, a data point can be defined S130 for each of the aggregated data flows.

This way, per-source (of data stream, sensor, performance counter) data flow aggregations are obtained, and for given time intervals, which make it possible to keep track of successive states of the non-stationary data captured and, eventually, to localize the sources of anomalies detected. Eventually, the communicational and computational resources may need be adjusted S30, e.g., in case anomalous data are detected.

In embodiments, queues of data at various entities 20, 40 of the network 2 are monitored S10. Data sampled may be received at a controller 30 (e.g., an external entity, as in FIG. 6) from the various entities 20, 40. The sampling mechanism may for instance be globally started and/or stopped from the controller 30. The latter may for instance be hardware, i.e., a physical machine (e.g., a server, running the monitoring process), or software (e.g., an application, implementing this monitoring process). More generally, the controller 30 may involve one or more machines (physical and/or virtual), interacting so as to implement the present process S10-S30.

If anomalous data is detected S10 (based on monitored observables 35) in the network 2, then a subset of the processing means 20 (corresponding to the communication channels for which anomalous data was detected) may be selected and corresponding communication and computation resources are next jointly adjusted S30 (again based on the monitored observables 35), as described earlier in reference to FIGS. 1-5.

Referring now more specifically to FIGS. 1, 2, and 6, another example embodiment concerns a computerized system 1, 2. As discussed above, the system may notably be a computerized network 2 or a single computer 1. More generally, though, the present system 1, 2 may be any computerized entity, be it a standard computer, a smartphone, a tablet, or coupled computers, etc. Functional aspects of such a system have already been discussed earlier, in reference to the present methods. Therefore, the system 1, 2 is only briefly described in the following.

Essentially, and consistently with the present methods, this system 1, 2 comprises a controller 30 for controlling communication and computation resources of the system 1, 2, as described earlier. I.e., the controller 30 is configured to continually monitor dual observables 35 (pertaining to both communication channels and a computational workload execution by processing means 20 of the system) and jointly adjust communication resources for said channels and computation resources for said computational workload execution, based on the monitored observables 35. The system 1, 2 will otherwise typically comprises hardware and software, as necessary to perform its basic tasks.

Next, according to a final aspect, an example embodiment may be a computer program product for controlling communication and computation resources of a computerized system 1, 2. This computer program product comprises a computer readable storage medium having program instructions embodied therewith, wherein the program instructions are executable by one or more processors of processing means 20, to cause the latter to take steps according to the present methods. Additional aspects of such computer program products are discussed in detail below. This program may for instance be run at a CPU 20 of the computer 1, or at nodes 20, 40 of the network 2 (possibly in a delocalized way), or at a dedicated entity 30 of this network 2, or still at selected nodes of the network 20. Many possible types of architectures can be contemplated, as the person skilled in the art will appreciate.

The present invention may thus be a computerized system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of controlling communication resources and computation resources of a computerized system, the method comprising:
    continually monitoring dual observables, the dual observables including one or more communication observables pertaining to data conveyed by one or more communication channels of the system, and further including one or more compute observables pertaining to an execution of computational workload based on a type and amount of processing by a processor of the system; and
    jointly adjusting dual resources of the system based on the dual observables monitored, the dual resources including communication resources for said one or more communication channels, and further including computation resources for said computational workload execution.

2. The method according to claim 1, wherein
said communication channels include one or more input/output channels to/from said processor, wherein adjusting the communication resources comprises adjusting a rate of data transfer across said one or more input/output channels.

3. The method according to claim 2, wherein
the dual resources are jointly adjusted by way of nested adjustment operations, wherein one or more adjustments are made to one of the communication resources and the computation resources, prior to adjusting the other one of the communication resources and the computation resources.

4. The method according to claim 3, wherein:
continually monitoring the dual observables further comprises,
    identifying a given computational state of said processor, the given computational state applicable to a given period of time, due to the compute observables monitored, and,
    identifying, during said given period of time, several successive sets of values of the communication observables, so as to identify several, successive communicational states of said input/output channels, wherein the communication resources are adjusted based on the successive communicational states identified.

5. The method according to claim 3, wherein:
continually monitoring the dual observables further comprises,
    identifying a given communicational state of said input/output channels, the given communicational state applicable to a given period of time, due to the communication observables monitored, and,
    identifying, during said given period of time, several successive sets of values of the compute observables, so as to identify several, successive computational states of said computational workload execution, wherein the computation resources are adjusted based on the successive computational states identified.

6. The method according to claim 2, wherein
adjusting the communication resources for the one or more input/output channels comprises temporarily modifying such resources for a period of time that is less than $1.0 \times 10^{-8}$ seconds.

7. The method according to claim 2, wherein
adjusting the communication resources comprises temporarily switching on or off one or more of said input/output channels.

8. The method according to claim 2, wherein
adjusting the communication resources comprises temporarily clocking up or down one or more of said input/output channels.

9. The method according to claim 8, wherein
said one or more of said input/output channels are incrementally clocked up or down within an interval ranging from 20 GHz to 60 GHz.

10. The method according to claim 2, wherein
the one or more communication observables monitored reflect states of one or more queues, buffers, or flags of data queuing in said input/output channels.

11. The method according to claim 10, wherein
the one or more communication observables monitored reflect states of one or more queues of data queuing in said input/output channels.

12. The method according to claim 1, wherein
continually monitoring the dual observables further comprises updating a metric based on the dual observables monitored, wherein the dual resources are jointly adjusted based on the updated metric.

13. The method according to claim 12, wherein
the dual resources are jointly adjusted according to a heuristic based on the updated metric.

14. The method according to claim 1, wherein
the dual resources are jointly adjusted according to outcomes of a machine learning model run based on values of the dual observables monitored, wherein the model has previously been trained based on values that can potentially be taken by the dual observables monitored.

15. The method according to claim 14, wherein
the machine learning model run is a model trained to detect anomalous data from the dual observables monitored, and
said dual resources are jointly adjusted based on a response selected according to the anomalous data detected.

16. The method according to claim 15, wherein
said machine learning model is implemented as an under complete autoencoder, wherein outcomes of the machine learning model run are obtained according to a reconstruction error of the autoencoder.

17. The method according to claim 1, wherein
monitoring said observables and/or jointly adjusting said resources comprise communicating with one or each of an arithmetic logic unit and a control unit of a central processing unit of the system.

18. The method according to claim 1, wherein
the system is a computerized network, and
the method further comprises, prior to jointly adjusting said resources:

selecting a subset of processing means of the computerized network based on monitored observables pertaining to one or more communication channels of the network; and jointly adjusting communication resources for said one or more communication channels and computation resources for the computational workload execution of the selected subset of the processing means, based on the monitored observables.

19. A computerized system comprising:

a controller for controlling communication resources and computation resources of the system, the controller configured to continually monitor dual observables, the dual observables including one or more communication observables pertaining to data conveyed by one or more communication channels of the system, and further including one or more compute observables pertaining to an execution of a computational workload based on a type and amount of processing by a processor of the system; and jointly adjust communication resources for said one or more communication channels and computation resources for said computational workload execution, based on the monitored observables.

20. A computer program product for controlling communication resources and computation resources of a computerized system, the computer program product comprising a computer readable storage medium having program instructions embodied therewith, the program instructions executable by one or more processors of the system, to cause to:

continually monitor dual observables, the dual observables including one or more communication observables pertaining to data conveyed by one or more communication channels of the system, and further including one or more compute observables pertaining to an execution of computational workload based on a type and amount of processing by a processor of the system; and jointly adjust communication resources for said one or more communication channels and computation resources for said computational workload execution, based on the monitored observables.

* * * * *